(12) United States Patent
Chang

(10) Patent No.: US 8,190,275 B2
(45) Date of Patent: *May 29, 2012

(54) PEER-TO-PEER HOME AUTOMATION MANAGEMENT

(76) Inventor: Michael Alan Chang, Saratoga, CA (US)

( * ) Notice: Subject to any disclaimer, the term of this patent is extended or adjusted under 35 U.S.C. 154(b) by 259 days.

This patent is subject to a terminal disclaimer.

(21) Appl. No.: 12/489,378

(22) Filed: Jun. 22, 2009

(65) Prior Publication Data
US 2010/0082176 A1 Apr. 1, 2010

Related U.S. Application Data

(60) Provisional application No. 61/100,612, filed on Sep. 26, 2008.

(51) Int. Cl.
G05B 11/01 (2006.01)
G06F 15/16 (2006.01)

(52) U.S. Cl. .............. 700/20; 700/19; 700/22; 700/291; 700/295; 709/229

(58) Field of Classification Search .................. 700/295, 700/291, 90, 19, 20, 22; 709/225, 219, 229; 348/E5.101, E7.061
See application file for complete search history.

(56) References Cited

U.S. PATENT DOCUMENTS

| | | | | |
|---|---|---|---|---|
| 4,959,713 A * | 9/1990 | Morotomi et al. | ............ | 348/156 |
| 5,086,385 A * | 2/1992 | Launey et al. | ............ | 700/83 |
| RE34,895 E * | 4/1995 | Morotomi et al. | ............ | 348/156 |
| 5,579,221 A * | 11/1996 | Mun | ............ | 700/83 |
| 5,621,662 A * | 4/1997 | Humphries et al. | ............ | 700/17 |
| 5,675,503 A | 10/1997 | Moe et al. | | |
| 6,185,466 B1 * | 2/2001 | Nicewonger | ............ | 700/19 |
| 6,192,282 B1 * | 2/2001 | Smith et al. | ............ | 700/19 |
| 6,199,136 B1 * | 3/2001 | Shteyn | ............ | 710/305 |
| 6,263,260 B1 * | 7/2001 | Bodmer et al. | ............ | 700/275 |
| 6,385,495 B1 * | 5/2002 | Bennett | ............ | 700/19 |
| 6,388,399 B1 * | 5/2002 | Eckel et al. | ............ | 315/312 |
| 6,792,319 B1 * | 9/2004 | Bilger | ............ | 700/19 |
| 6,813,221 B1 * | 11/2004 | Barr | ............ | 700/245 |
| 6,813,631 B2 * | 11/2004 | Pouchak et al. | ............ | 700/86 |
| 6,859,669 B2 * | 2/2005 | An | ............ | 700/19 |
| 6,865,427 B2 * | 3/2005 | Brown et al. | ............ | 700/19 |
| 6,865,428 B2 * | 3/2005 | Gonzales et al. | ............ | 700/86 |
| 6,868,295 B2 * | 3/2005 | Huang | ............ | 700/90 |
| 6,879,806 B2 | 4/2005 | Shorty | | |

(Continued)

OTHER PUBLICATIONS

Chemishkian, S., "Building Smart Services for Smart Home", Jan. 2002, Proceedings of the 2002 IEEE 4th Intl. Workshop on Networked Appliances, IEEE Xplore Online.*

(Continued)

Primary Examiner — Kakali Chaki
Assistant Examiner — Kelvin Booker
(74) Attorney, Agent, or Firm — Nixon Peabody LLP; John P. Schaub

(57) ABSTRACT

A first home automation control device is configured to control a first electrical appliance and to communicate via a peer-to-peer network with a second home automation control device which is configured to control a second electrical appliance. When the first home automation control device discovers the presence of the second home automation control device, the first home automation control device negotiates with the second home automation control device to determine a goal. The first home automation control device and the second home automation control device then jointly execute a task to achieve the goal. The goal may be an energy savings goal.

20 Claims, 2 Drawing Sheets

U.S. PATENT DOCUMENTS

| | | | |
|---|---|---|---|
| 6,891,478 B2 | 5/2005 | Gardner | |
| 7,047,092 B2* | 5/2006 | Wimsatt | 700/19 |
| 7,082,200 B2* | 7/2006 | Aboba et al. | 380/273 |
| 7,102,502 B2* | 9/2006 | Autret | 700/1 |
| 7,136,709 B2* | 11/2006 | Arling et al. | 700/65 |
| 7,310,344 B1 | 12/2007 | Sue | 370/410 |
| 7,417,397 B2* | 8/2008 | Berman et al. | 318/468 |
| 7,551,071 B2* | 6/2009 | Bennett et al. | 340/506 |
| 7,620,724 B2* | 11/2009 | Weisman et al. | 709/227 |
| 7,734,572 B2* | 6/2010 | Wiemeyer et al. | 700/19 |
| 7,774,477 B2* | 8/2010 | Zintel et al. | 709/227 |
| 7,844,353 B2* | 11/2010 | Bejean et al. | 700/83 |
| 7,860,679 B2* | 12/2010 | Rouhier et al. | 702/108 |
| 7,865,252 B2* | 1/2011 | Clayton | 700/275 |
| 7,884,727 B2* | 2/2011 | Tran | 700/278 |
| 7,965,174 B2* | 6/2011 | Wong et al. | 700/276 |
| 7,992,014 B2* | 8/2011 | Langgood et al. | 700/295 |
| 2002/0016639 A1* | 2/2002 | Smith et al. | 700/19 |
| 2003/0233201 A1 | 12/2003 | Horst et al. | |
| 2005/0232283 A1 | 10/2005 | Moyer et al. | |
| 2006/0259183 A1* | 11/2006 | Hayes et al. | 700/221 |
| 2007/0112939 A1* | 5/2007 | Wilson et al. | 709/219 |
| 2007/0192486 A1* | 8/2007 | Wilson et al. | 709/225 |
| 2008/0183307 A1* | 7/2008 | Clayton et al. | 700/8 |
| 2008/0279161 A1* | 11/2008 | Stirbu et al. | 370/338 |
| 2009/0020233 A1* | 1/2009 | Berman et al. | 700/275 |
| 2009/0066534 A1* | 3/2009 | Sivakkolundhu | 340/825.52 |
| 2009/0217335 A1* | 8/2009 | Wong et al. | 725/114 |
| 2009/0254222 A1* | 10/2009 | Berman et al. | 700/275 |
| 2010/0076615 A1* | 3/2010 | Daniel et al. | 700/296 |
| 2010/0121968 A1 | 5/2010 | Clark | |

OTHER PUBLICATIONS

Kim, T.; Kim, D.; Park, N.; Yoo, S; and Lopez, T.S., "Shortcut Tree Routing in ZigBee Networks", Feb. 2007, Second Intl. Symposium on Wireless Pervasive Computing, IEEE Xplore Online.*

Oh, H.W.; Han, I.T.; and Park, K.R., "A Power Saving System Based on Energy-Aware Control Elements in Ubiquitous Home Network", Apr. 2008, IEEE Intl. Symposium on Consumer Electronics, IEEE Xplore Online.*

Palensky, P.; Dietrich, D; Posta, R.; and Reiter, H., "Demand Side Management in Private Homes by Using LonWorks", Oct. 1997, 1997 IEEE Intl Workshop on Factory Communication Systems, IEEE Xplore Online.*

Rao, K.S.R.; Meng, Y.T.; and Syafrudin, M., "PC Based Energy Management and Control System of a Building", 2004, 2004 Proceedings of National Power and Energy Conference.*

Shwehdi, M.H. and Khan, A.Z., "A Power Line Data Communication Interface Using Spread Spectrum Technology in Home Automation", Jul. 1996, IEEE Transactions on Power Delivery, vol. 11, No. 3.*

Tsai, C. and Wu, H., "Massihn: A Multi-Agent Architecture for Intelligent Home Network Service", Aug. 2002, IEEE Transactions on Consumer Electronics, vol. 48, Iss. 3.*

Tsang, K.F.; Lee, W.C.; Lam, K.L.; Tung, H.Y.; and Xuan, K., "An Integrated ZigBee Automation System: An Energy Saving Solution", Dec. 2007, 14$^{th}$ Intl Conference on Mechatronics and Machine Vision in Practice, IEEE Xplore Online.*

Williams, E.; Matthews, S.; Breton, M.; and Brady, T., "Use of a Computer-Based System to Measure and Manage Energy Consumption in the Home", May 2006, Proceedings of the 1996 IEEE Intl Symposium on Electronics and the Environment, IEEE Xplore Online.*

Cuevas, R.; Guerrero, C.; Guevas, A.; Calderon, M.; and Bernardos, C.J., "P2P Based Architecture for Global Home Agent Dynamic Discovery in IP Mobility", Apr. 2007, IEEE 65$^{th}$ Vehicular Technology Conference 2007, ISSN: 1550-2252, ISBN: 1-4244-0266-2.*

Hlavacs, H.; Weidlich, R.; Hummel, K.A.; Houyou, A.M.; Berl, A.; and Meer, H., "Distributed Energy Efficiency in Future Home Environments", Dec. 2007, Annals of Telecommunications, vol. 63, No. 9-10, p. 473-485.*

Lee, I.; Choi, M; Lee, S.; and Park, H., "A Development of Application Service on the Peer-to-Peer Based Virtual Home Platform", Feb. 2007, The 9$^{th}$ Intl Conference on Advanced Communication Technology, ISSN: 1738-9445, ISBN: 978-89-5519-131-8, pp. 1579-1582.*

Turcan, E.; Graham, R.L.; and Hederen, J., "Peering the Smart Homes", 2002, Proceedings of the First International Conference on Peer-to-Peer Computing, IEEE Computer Society.*

Bapst, U.; Bednorz, J.G.; Mannhart, J.; Mueller, P.; Reihl, B.; Stroebel, J. and Widmer, D., "ARIGO—A Peer-to-Peer Home Automation Network", Sep. 1995, IBM Technical Disclosure Bulletin, vol. 38, No. 09, IP.com Prior Art Database.*

Allan Chen, a_chen@lbl.gov, Automated Demand Response, How the internet helps the electricity grid in California, Science@Berkeley Lab, Mar. 5, 2008.

INSTEON™ Development Kit—Serial, http://www.smarthome.com/insteon/sdk2600S.html, Sep. 15, 2008, 3 pages.

Paul Darbee, Insteon Compared, Copyright 2006 SmartLabs, Inc., Jan. 2, 2006, 69 pages.

Zwave® The Standard in Wireless Home Control, Remote Home Management, Safety & Security, Energy Conservation, Entertainment Control, Comfort & Convenience, Zensys Inc., www.zen-sys.com, 6 pages.

Bob Heile, Chairman, ZigBee™ Alliance, Wireless Control That Simply Works, Wireless Sensors and Control Networks: Enabling New Opportunities with ZigBee, Dec. 2006, 27 pages.

IEC Intelligent Technologies™, A LONWORKS® Technology Tutorial, http://www.ieclon.com/LonWorks/LonWorksTutorial.html, Sep. 22, 2008, 15 pages.

Electronic design, Embedded, EiED Online>>Insteon Now, http://electronicdesign.com/Articles/Index.cfm? AD=1&AD=1&AD..., Sep. 15, 2008, 4 pages.

Office Action in U.S. Appl. No. 12/730,042, mailed Jun. 17, 2011.

Notice of Allowance in U.S. Appl. No. 12/730,042, mailed Nov. 7, 2011.

* cited by examiner

PEER-TO-PEER HOME AUTOMATION MANAGEMENT

CROSS REFERENCE TO RELATED APPLICATIONS

This application claims the benefit of provisional patent application No. 61/100,612 filed Sep. 26, 2008, entitled "Peer-to-Peer Home Automation Management."

FIELD OF THE INVENTION

The present invention relates to the field of computer science. More particularly, the present invention relates to peer-to-peer home automation management.

BACKGROUND OF THE INVENTION

With the rising energy cost, energy conservation and effective distribution of energy consumption have taken on increasing importance.

Utility companies have introduced and deployed numerous technologies to help manage electricity demand during peak hours, although most of this effort thus far has been directed at utility's commercial customers through technologies such as AutoDR (Automated Demand Response). See, e.g., Allen Chen, "Automated Demand Response—How the internet helps the electricity grid in California", Mar. 5, 2008, http://drrc.lbl.gov/pubs/sci-lbnl-3-5-08-adr.pdf. AutoDR allows the utility company to automatically demand its AutoDR customers' electrical appliances to automatically lower their energy consumption during peak energy use periods to prevent brown outs or black outs.

Most consumers have no knowledge on the energy consumption levels of various household appliances and electrical devices which consume electricity and generally rely on common sense to conserve electricity use. With the advent of home automation technologies both in the wireless and power-line based areas, an increasing number of devices and technologies are being offered to the consumers to perform smart energy management in a consumer household. Such technologies include, for example, Insteon™, Z-Wave®, ZigBee®, Echelon®, and the like.

Insteon™ technology from SmartLabs, Inc., is one of the most popular home automation technologies on the market. Insteon™ technologies implement a dual-mesh network, which essentially means that the Insteon™ technologies support two means of communication to back each other up: radio frequency signals and the home's existing electrical wiring. All Insteon™ devices are peers, meaning that any Insteon™ device can transmit, receive, or repeat messages from other peers without a master controller or elaborate routing software. The frequency that the Insteon™ RF devices send transmissions is 904 MHz, and the raw sustained Insteon™ bitrate stands at 2,880 bps for both standard and extended messages.

The Z-Wave® protocol is an interoperable wireless communication protocol that is also implemented in home automation necessities. Because a Z-wave® network is not peer-to-peer, it is substantially more arduous to synchronize all the additional Z-wave® devices to other Z-wave® enabled devices than Insteon™ devices. Also, the Z-Wave® protocol is entirely reliant on radio signals thus causing its designers gave it a significant number of complex features to augment its reliability. The frequency at which a Z-Wave® network transfers messages is 908.42 MHz in the United States, while it stands at 868.42 MHz in Europe. A Z-Wave® network routes messages through its network using the Source Routing Algorithm (SRA) which requires message initiator to know the network topology so it can compute the best route to send the message. Low-end Z-Wave® devices incapable of routing messages are called slaves. A Z-Wave® network relies on a central control unit called a Static Update Controller (SUC) to manage message routing within a Z-Wave® network. The Z-Wave® protocol is backed by Zensys A/S, now a division of Sigma Designs, Inc. Zensys A/S supplies Z-Wave® chips; Zensys A/S is also the assignee of U.S. Pat. No. 6,879,806, entitled "System and method for building routing tables and for routing signals in home automation."

ZigBee® technology is a cost-effective, power-efficient, wireless technology that is frequently used as an alternative to both Bluetooth® technology and Wi-Fi® technology. Like all the technologies listed above, ZigBee® technology establishes a mesh network between nodes. ZigBee® technology relies on IEEE 802.15.4 radios, which transmits at a frequency of 2.4 GHz and 915 MHz in the United States while it transmits at a frequency of 2.4 GHz and 868 MHz in Europe. ZigBee® technology establishes an application/framework and network/security layers on top of existing IEEE 802.15.4 standards. The data rate of ZigBee® networks varies depending on the frequency at which the IEEE 802.15.4 transmits. The network layer of ZigBee® software supports star, mesh, and cluster tree (hybrid of star and mesh) network topologies. ZigBee® technology is defined by two kinds of devices: FFDs (full function devices), and RFDs (reduced function devices). Typically line powered, FFDs can communicate with all other FFDs and RFDs, act as network and link coordinators, discover other FFDs and RFDs, and can perform all of the RFD's functions. RFDs can be installed only in a star network because they can communicate with only the FFD network communicator. To support device interoperability, ZigBee® devices support a number of "profiles" and there are currently a number of private profiles supported by private manufacturers and public profiles supported by the ZigBee Alliance®.

Echelon LONWORKS® is a networking platform that is generally used to network devices over fiber optics, power lines, twisted pair, coax, infrared, and radio, with the majority of installations using dedicated twisted pair wiring. Deployed mainly in building and factory automation and commercial control, Echelon LONWORKS® is a sophisticated routed network that uses loop-free (learning) routers and repeaters to send transmissions reliably. Intended as a BACnet (Building Automation Control network) replacement, the LONWORKS® uses a protocol called LONTALK®, standardized with ANSI/CEA 709.1 and IEEE 1473-L. LONWORKS® is a routed network that uses learning routers and repeaters to deliver messages consistently and reliably. For manufacturers implementing the LONWORKS® networking platform and its LONTALK® protocol, Echelon® technology embeds the protocol stack and processing power into a Neuron® semiconductor to simplify the productization process. The LONTALK® protocol design follows the International Standards Organization's Reference Model for Open Systems Interconnection (ISO OSI), which prescribes the structure for open communications protocols. LONWORKS® is unique in that it is the only control protocol that implements all seven layers of this model. The LONTALK® protocol defines a hierarchical form of addressing using domain, subnet, and node addresses. This form of addressing can be used to address the entire domain, an individual subnet, or an individual node. Interoperability among different LONWORKS® devices from different manufacturers is achieved through the use of Standard Network Variables Types or SNVTs and the binding of SNVTs.

There are numerous home automation and energy management products in the market today based on the above mentioned technologies: Insteon™, Z-Wave®, ZigBee®, and Echelon LONWORKS®. However, all of these products operate strictly within the realm of the technology they are based on, and tend to operate independently and passively follow the protocol dictated by the technology to perform a fixed function. These products typically lack an application layer which operates above the underlying technology platform to deliver a specific result through collaboration of a collection of related products.

Various solutions for electrical load shedding control arrangement exist. In published U.S. Patent Application No. 2005/143856, Gardner teaches a system and method that accepts commands from the utility companies to control household appliances such as an air conditioner to reduce electricity consumption for settable periods of time during peak demand period (to prevent occurrences like brownouts). In U.S. Pat. No. 6,891,478, Gardner teaches a system that distributes power to various electronic appliances. However, Gardner's solution relies solely on the power lines to distribute the power, and the devices directly transfer the power from one device to another. Gardner's solution is directed toward households with a generator, as opposed to power from a plant. In addition, Gardner's solution features a centralized control unit wherein the intelligence of the system resides. In U.S. Pat. No. 5,675,503, Moe teaches a system that uses historical performance data of an electrical appliance, such as an air conditioner, to determine how to best cycle the appliance to meet the load shedding demands requested from a local utility company while maintaining indoor temperature within an acceptable range.

However, all the solutions described above deal with a centralized power monitoring and control system with power management intelligence centralized at a central server/controller located either at the utility company or at a central power generating source. The solutions described above provide energy management and load shedding control based on commands issued and/or programmed from a centralized server/controller device. These prior solutions rely on an expensive centralized server in order to operate, and have slow performance due to the need to always check with a centralized server in order to perform its functions and lack of extensibility as new devices may be difficult to be added to the network without reprogramming the centralized server. None of these solutions provide for individual electricity consuming devices to negotiate among themselves to achieve a desired energy consumption level in a household or a commercial building.

Accordingly, a need exists for an improved solution for home automation management. A further need exists for such a solution that allows household or commercial appliances to dynamically negotiate to achieve desired energy savings results.

SUMMARY OF THE INVENTION

A first home automation control device is configured to control a first electrical appliance and to communicate via a peer-to-peer network with a second home automation control device which is configured to control a second electrical appliance. When the first home automation control device discovers the presence of the second home automation control device, the first home automation control device negotiates with the second home automation control device to determine a goal. The first home automation control device and the second home automation control device then jointly execute a task to achieve the goal. The goal may be an energy savings goal.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
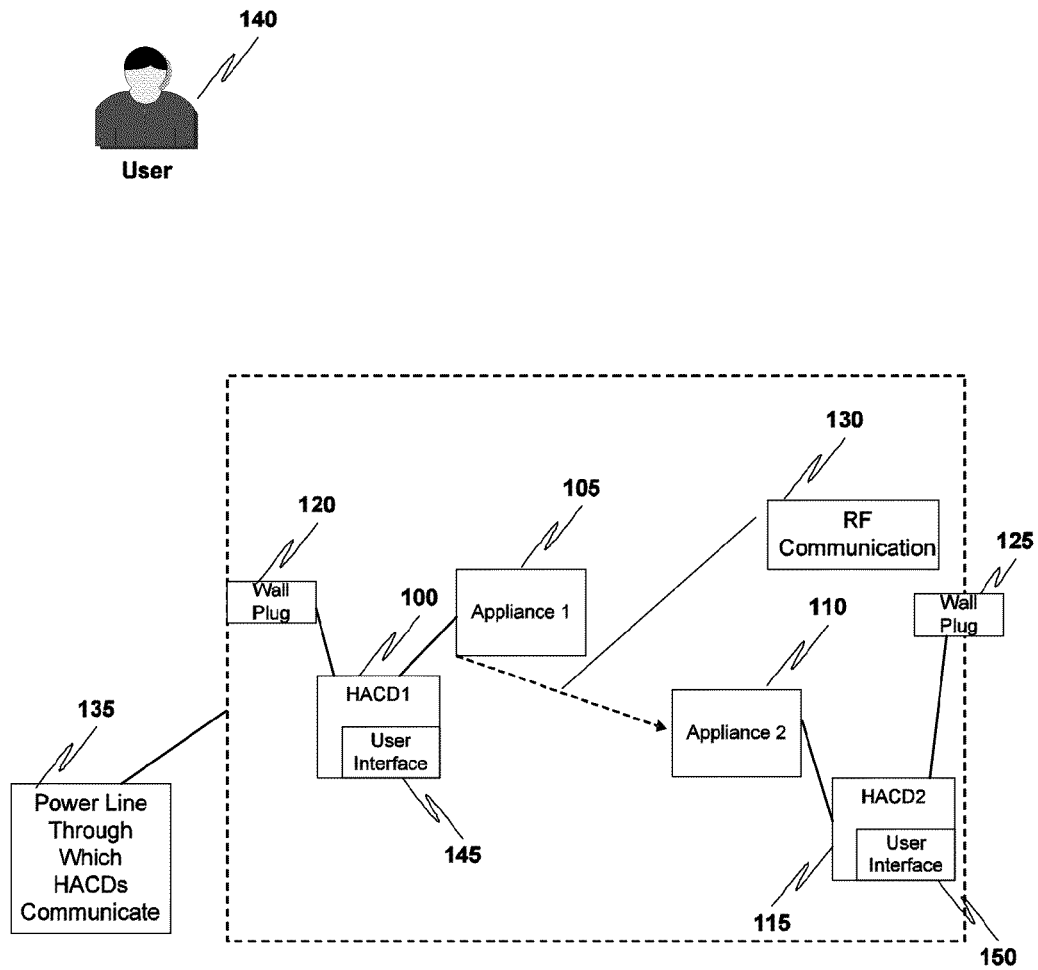
FIG. 1 is a block diagram that illustrates a system for peer-to-peer home automation management in accordance with one embodiment of the present invention.

Embodiments of the present invention are described herein in the context of peer-to-peer home automation management. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to embodiments of the present invention, household or commercial building electrical appliances are equipped with a wireless or a power-lined (or both) Home Automation Control Device (HACD). The HACD and the appliance may be physically separate, or the appliance may comprise the HACD. Although the term "Home Automation" is used to describe specific embodiments of the present invention, embodiments of the present invention are not limited to a home environment. Embodiments of the present invention may also be applied in a commercial building environment.

According to one embodiment of the present invention, a HACD is a microcontroller-based device with memory storage capable of storing program instructions and intelligence and equipped with one or more of the technologies described earlier (such as Insteon™, Z-Wave®, ZigBee®, LonWorks®, etc.) to communicate with its peer devices and to determine the current electrical power usage of the electrical appliance the HACD is controlling. According to one embodiment of the present invention, an HACD comprises a 3-prong electric outlet which can be plugged into a standard household electric outlet and the appliance this HACD controls can be plugged into the HACD.

According to one embodiment of the present invention, a HACD comprises a user interface (145, 150), such as an LCD display, configured to present a current task that has been designated by the user or other peer HACDs. The designated task can be altered by an optional numeric or alphabetical input pad on the HACD which the user can key in data. According to one embodiment of the present invention, a user enters into a HACD the desired energy saving numbers in watt-hours and/or energy saving percentage goal compared to a previous period. According to one embodiment of the present invention, a user enters the maximum power consumption of an appliance controlled by a HACD device over a time period. According to another embodiment of the present invention, the user enters the priority level into a HACD to indicate the energy saving priority of the appliance it controls. According to yet another embodiment of the present invention, the current performance such as energy saved of a HACD controlled appliance is displayed on the LCD of the HACD. According to another embodiment of the present invention, the HACD comprises an override button on its panel such that once the button is pressed, the HACD will temporarily suspend any control of the appliance it controls until the override button is cancelled. In this scenario, the HACD will still continue to report and monitor the energy usage of the appliance it controls to other HACDs in the network.

The following description applies to an implementation using the Insteon™ technology. However, embodiments of the present invention are not limited to the use of Insteon™ technology. Similar implementations could also be devised using other comparable home automation technologies including ZigBee®, Z-Wave®, Echelon LonWorks®, and the like.

There are certain characteristics of peer-to-peer network as applied in Home Automation in embodiments of the present invention that should be noted. First, the number of nodes that participate in completing a task in a peer-to-peer network is voluntary as long as the desired results can be achieved. The number of nodes participating cannot be predetermined like in conventional home automation 'scenes.' Second, the behavior of each participating node can depend on the current behavior of other participating nodes and other environmental factors. Third, each node can repeatedly check with other peer nodes to get the latest information and status of other nodes and each node is actively re-computing its algorithm based on the current status received of other nodes such that an optimal algorithm based on the current overall network condition can be instantly calculated.

Consider the following user scenario in accordance with embodiments of the present invention. When the temperature reaches above 100 degrees, the HACD controlling the air conditioner sends a message to other peer-to-peer HACD devices in the same household to discover which of the other devices in the network are online. The air conditioner HACD negotiates with other peer-to-peer HACD devices to see which one(s) can reduce power consumption first. In turn, each peer-to-peer HACD device determines dynamically how, how often, and when to reduce power so that a total power conservation goal of, for example, 9 to 11 percent can be jointly achieved. As these cycles transpire, each peer-to-peer HACD device repeatedly interacts with one another to dynamically check the latest result and validate total power saving goals. In another possible scenario, an appliance connected to a HACD is manually overridden. If the appliance connected to a HACD is manually overridden to bypass its HACD, then that HACD will notify other HACDs which can adjust the operation of the devices they control accordingly so that the overall goal of 9 to 11 percent energy savings is still maintained.

Embodiments of the present invention may include one or more of the following advantages. Because there is no need for a centralized server/controller, the overall system cost can be cheaper. Also, because there is no need for each peer device to repeatedly consult with the centralized server/controller, decision making at the peer device level can be made more quickly. Additionally, because of the peer-to-peer nature, the network has no single point of failure. Also, as new peer devices are added, the peer-to-peer network automatically discovers it and adjusts its algorithm to accommodate the newly added devices without any user programming or reconfiguration effort.

FIG. 1 is a block diagram that illustrates a system for peer-to-peer home automation management in accordance with one embodiment of the present invention. As shown in FIG. 1, a first HACD 100 is connected to appliance 105 and wall plug 120. Appliance 110 is connected to a second HACD 115 and wall plug 125. The HACDs (100, 115) can communicate through power lines 135 and/or RF 130, depending on the underlying technology used. The HACDs (100,115) automatically discover each other and are capable of negotiating with one another to successfully achieve the task or goal designated by the user 140.

Figure 2:
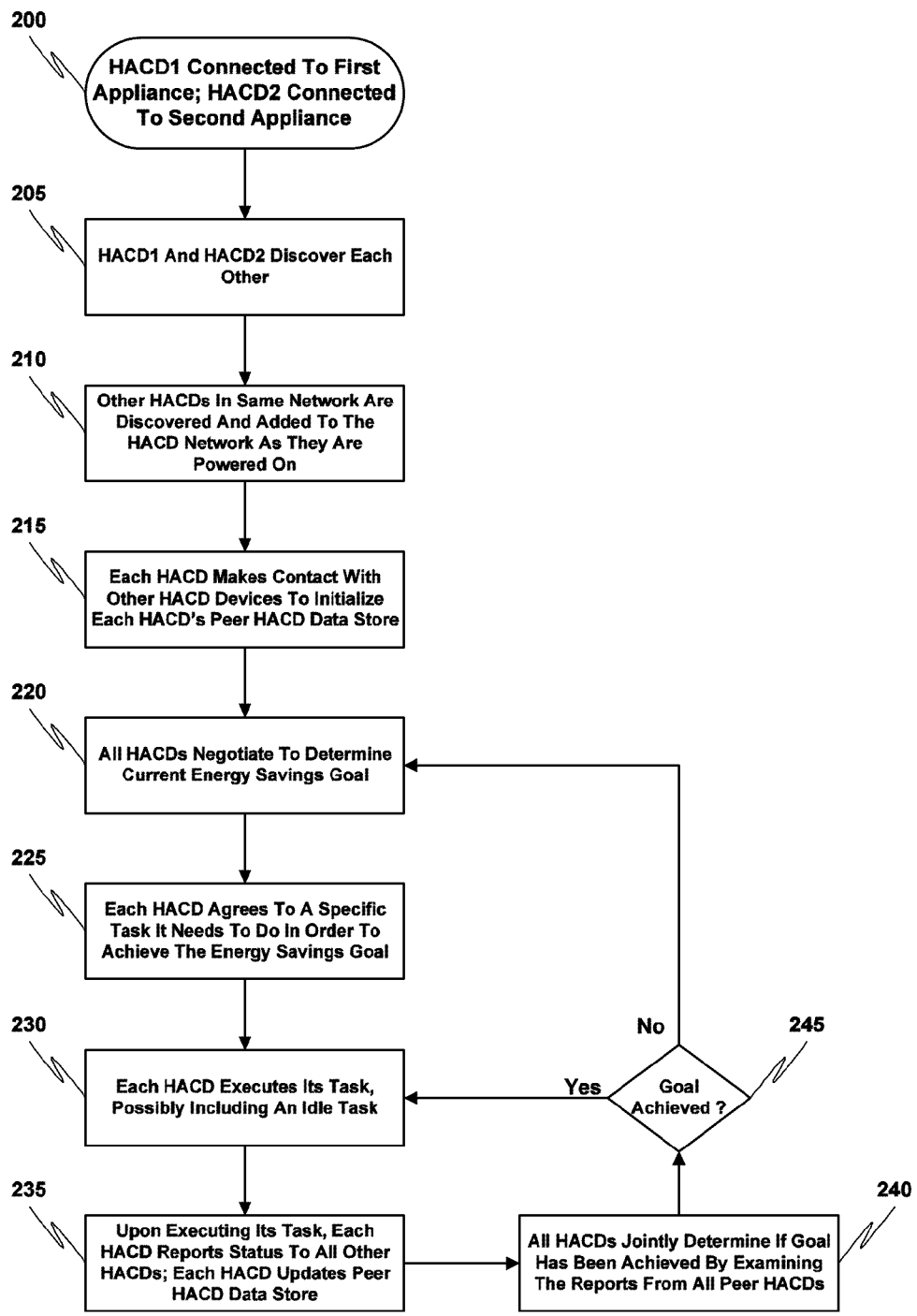
FIG. 2 is a flow diagram that illustrates a method for peer-to-peer home automation management in accordance with one embodiment of the present invention.

FIG. 2 is a flow diagram that illustrates a method for peer-to-peer home automation management in accordance with one embodiment of the present invention. The process steps shown in FIG. 2 may be implemented in hardware, software, firmware, or a combination thereof. FIG. 2 illustrates using Insteon™ technology and the Insteon™ Development Kit (Serial) with SALad capability. Other underlying technologies such as Z-Wave®, ZigBee®, Echelon® and the like may be used as well.

At 200, a first home automation control device HACD1 is connected physically to a first appliance. A second home automation HACD2 control device is physically connected to a second appliance.

According to one embodiment of the present invention, each HACD is pre-programmed with programmable instructions to follow certain algorithm to communicate with other peer HACDs in order to achieve a specific purpose such as energy management. Using the example shown in FIGS. 1-2, both the first home automation control device HACD 1 and the second home automation control device HACD 2 use pre-programmed logic to communicate and negotiate with each other to lower the household electricity use by a certain target amount. At 205, the first home automation control device and the second home automation control device discover each other via the underlying home automation technologies such as Insteon™ technology. In the case of Insteon™ technology, the first home automation control device and the second home automation control device discover each other on the Insteon™ home automation network via either radio frequency (904 MHz) or the power-line medium. In the case of Insteon™-based implementation, peer-to-peer intelligence for the first home automation control device and the second home automation control device is pre-programmed as instructions which are downloaded into each of the first home automation control device and the second home automation control device via the Insteon™ development environment called sIDE (Smartlabs Integrated Development Environment). On each Insteon™-based home automation control device, an embedded language interpreter called SALad allows the instructions to be executed. SALad is designed with sufficient limitations that prevent an application from causing a crash in the home automation control device.

At 210, upon powering up, each HACD automatically discovers the presence of the rest of HACDs in the same network environment. In the case of Insteon™ technology, this discovery is achieved via an Insteon™ Simulcast message which is broadcasted from one HACD to all other HACD devices on the same Insteon™ network.

Each HACD is optionally equipped with intelligence to determine the type of electrical appliance it is physically connected to or this information could be entered manually by the user via an optional input keypad of the HACD. The programming instructions downloaded in each of the HACDs may be unique to the physical electrical appliance the HACD is specifically connected to and may contain specific programming instructions unique to the type of the physical appliance it controls. For example, if a HACD controls the power of an air conditioner, the HACD's programming instructions may contain data related to the average power consumption of that air conditioner, normal current drawn by that air conditioner, ambient current drawn by that air conditioner, efficiency of the air conditioner under certain temperature range, as well as a peer HACD data store. The peer HACD data store, which may be stored in HACD memory in a table format or another format, indicates what other types of peer HACDs this air conditioner may require to collaborate with in order to conserve energy. This peer HACD data store, which is stored in a data structure in each HACD, contains not only the current status of all its peer HACD devices and the appliances they control, but a priority indicator (which can be changed by the user) that the HACD can refer to so that it comprehends the energy saving priority of each of the appliances in this HACD network. In this example, other HACDs which may be of value to this air conditioner may include for example, a HACD that monitors a thermostat, a HACD that controls a high power electrical appliance such as a dryer or a HACD that controls a motion sensor. At 215, this peer HACD data store is automatically filled in by each HACD during the discovery process after each HACD discovers the presence of other HACDs in the same household. This peer HACD data store is continually updated by each of the HACDs in real-time to maintain synchronization between all HACDs in the same network.

Once a HACD is fired up, it follows its programming instructions to establish contact with other peer HACDs of interest in the same network according to the peer HACD data store described at 215. Once the initiating HACD discovers and establishes communication with another HACD of interest in the same network, at 220 all HACDs of interest engage in a series of communications using the underlying technology such as Insteon™ in an attempt to deliver better performance. In the case of energy management, better performance can be defined as reducing the electricity consumption by 9-11%, for example. Two or more HACDs can be engaged in the same session to jointly achieve a specific result. The performance goals can be pre-programmed into each HACD or manually set on one or more HACDs.

According to one embodiment of the present invention, each of multiple HACDs in the same network are configured to, when there are conflicting performance goals among the multiple HACDs, negotiate with one another to deliver an optimized performance based on a combination of different goals. For example, if one HACD is pre-programmed to conserve energy consumption by 9-11% and another HACD is pre-programmed to conserve energy consumption by 13-16%, then the two HACDs will negotiate so that a minimum goal of, for example, 10% energy savings is agreed upon.

According to one embodiment of the present invention, the communication and message exchange between each of the HACDs is provided by the underlying home automation network such as an Insteon™ home automation network and will not be described here.

According to one embodiment of the present invention, each HACD engaged in a session has the ability to send a command to a receiving HACD or to receive a command from another HACD. For example, a HACD connected to an air conditioner may send command to a sensor with built-in HACD functionality and if motion is detected as reported by the sensor HACD, the air conditioner HACD may choose to turn the air conditioner on. Furthermore, the HACD controlling an air conditioner may further query a HACD controlling a temperature sensor and cycle off the air conditioner unit when the current temperature falls below a first threshold temperature and cycle on the air conditioner when the temperature rises above a second threshold temperature. In addition, the HACD controlling an air conditioner may send commands to other HACDs controlling high wattage electrical appliances such as an electric dryer such that when the air conditioner is on, the dryer operation could be time-delayed (controlled by the dryer's HACD) until such time when the air conditioner is cycled off. The end result is to avoid spikes in electricity consumption during high energy demand periods.

Referring again to FIG. 2, at 225, each of the HACDs interacts and negotiates with other HACDs in the same network such that a specific purpose can be achieved. Each HACD agrees to a specific task it needs to complete in order to achieve the energy savings goal.

At 230, each HACD executes its task to achieve the energy savings goal. Depending on the energy savings goal and the capabilities of the other HACDs, the task of a particular HACD may be performing an idle task.

At 235, upon executing its task, each HACD reports its status to all other HACDs. Each HACD updates its internal peer HACD data store with the results.

At 240, by examining the reports from peer HACDs, each HACD jointly determines whether the energy savings goal has been achieved.

At 245, a determination is made regarding whether the energy savings goal has been achieved. If the joint goal has been achieved, at 230 each HACD can determine whether to continue to execute its current task or go idle. In either case, each HACD continues to report its status to its peer HACD devices in the network. If the joint goal has not yet been achieved, beginning at 220 the HACDs will repeat the negotiation process and determine newly assigned tasks for each HACD to execute in an attempt to deliver on that goal. The cycle repeats until the joint goal is achieved.

Embodiments of the present invention have been described using the Insteon™ technology as the underlying home automation network and technology. Similar implementations can be achieved using other home automation technologies such as ZigBee®, Echelon®, Z-Wave®, or the like.

According to one embodiment of the present invention, a system and method for peer-to-peer home automation management is implemented using ZigBee® technology. In the case of ZigBee® technology, a developer can choose to only license the networking layer of the ZigBee® protocol and develop his or her own application and/or network security layers. In this event, the developer will be developing a private profile. ZigBee®-based HACDs can inter-operate using private profiles. HACD can be implemented using ZigBee® FFDs (Full Function Devices) which typically utilizes chips which contain the ZigBee software stack along with IEEE 802.15.4 radios and 128K bytes of onboard memory, which can be used to store HACD programmable instructions. A HACD can act as the "network coordinator" required by the ZigBee® Network or multiple HACDs can act as the "network coordinators."

According to one embodiment of the present invention, a system and method for peer-to-peer home automation management is implemented using Echelon LONWORKS® technology. The Echelon NodeBuilder® development tool is a hardware and software development platform that is used to develop LONWORKS® devices based on the Neuron® chips. As stated previously, Neuron® chips are sold by Echelon to manufacturers implementing Neuron® chips in their products. The NodeBuilder® development tool is essentially the Echelon version of Insteon's SALad program. It can edit NeuronC code (the language of the Neuron® chips), generate Neuron® C code, create NodeBuilder® projects, and more. With the Echelon NodeBuilder® development tool, a programmer could write applications for Neuron® chips using Neuron® C code.

According to one embodiment of the present invention, a system and method for peer-to-peer home automation management is implemented using Z-Wave® technology. Zensys's Z-Wave® development kit enables developers and original equipment manufacturers (OEMs) to design and develop products that network wirelessly using Z-Wave® technology. This Development kit contains software and detailed documentation necessary to design and write application software for Z-Wave® technology on top of Z-Wave® protocol API. Programmers can use a C compiler to write firmware to download to the flash memory on the Zensys chip. Zensys provides a library of API routines in a Windows DLL to help with this task.

While peer-to-peer home automation has been described above in the context of energy management, there are many other types of home automation applications without departing from the inventive concepts described herein. For example, embodiments of the present invention may be applied to home elderly care, home security, home surveillance, home entertainment, etc., wherein HACD-type devices act in a peer-to-peer manner to jointly achieve a predetermined goal.

Additionally, while peer-to-peer home automation has been described above in the context of two "peers," embodiments of the present invention may be applied peer-to-peer home automation networks having three or more peer home automation control devices.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
at a first home automation control device configured to control a first electrical appliance, discovering the presence of the second home automation control device configured to control a second electrical appliance, each of the first home automation control device and the second home automation control device configured as a peer device in a peer-to-peer network and comprising a data store for storing status information regarding all peer devices in the peer-to-peer network;
negotiating, via a sequence of message exchanges over the peer-to-peer network, with the second home automation control device to deliver an optimized performance based at least in part on a first energy savings goal of the first home automation control device and a second energy savings goal of the second home automation control device; and
executing a task to achieve the optimized performance.

2. The method of claim 1, further comprising repeating the negotiating and the executing until the optimized performance is achieved.

3. The method of claim 1, further comprising:
after the discovering, contacting the second home automation control device to initialize a peer home automation control device data store of the first home automation control device, with a status of the second home automation control device; and
after the executing, reporting a status of the first home automation control device to the second home automation control device.

4. The method of claim 1 wherein:
the first energy savings goal comprises an energy savings goal compared to a previous period; and
the second energy savings goal comprises an energy savings goal compared to a previous period.

5. The method of claim 1 wherein:
the first energy savings goal comprises an indication of a maximum power consumption of the first electrical appliance over a time period; and
the second energy savings goal comprises an indication of a maximum power consumption of the second electrical appliance over a time period.

6. The method of claim 1 wherein the determining is based at least in part on an energy saving priority of the first electrical appliance.

7. The method of claim 1 wherein
the first home automation control device is configured to removably couple with the first electrical appliance; and
the second home automation control device is configured to removably couple with the second electrical appliance.

8. The method of claim 1, wherein the task comprises an idle task.

9. The method of claim 1, wherein the method is implemented according to one or more of:
a ZigBee standard;
an Insteon;
an Echelon LONWORKS standard; and
a Z-Wave standard.

10. An apparatus comprising:
a home automation data store for a first home automation control device configured to control a first electrical appliance, each of the first home automation control device and a second home automation control device configured as a peer device in a peer-to-peer network and comprising a data store for storing status information regarding all peer devices in the peer-to-peer network; and a processor configured to:
discover the presence of the second home automation control device;
negotiate, via a sequence of message exchanges over the peer-to-peer network, with the second home automation control device to deliver an optimized performance based at least in part on a first energy savings goal of the first home automation control device and a second energy savings goal of the second home automation control device; and
execute a task to achieve the optimized performance.

11. The apparatus of claim 10, wherein the processor is further configured to repeat the negotiating and the executing until the optimized performance is achieved.

12. The apparatus of claim 10, wherein the processor is further configured to:
after the discovering, contact the second home automation control device to initialize the peer home automation control device data store, with a status of the second home automation control device; and
after the executing, report a status of the first home automation control device to the second home automation control device.

13. The apparatus of claim 10 wherein:
the first energy savings goal comprises an energy savings goal compared to a previous period; and
the second energy savings goal comprises an energy savings goal compared to a previous period.

14. The apparatus of claim 10 wherein:
the first energy savings goal comprises an indication of a maximum power consumption of the first electrical appliance over a time period; and
the second energy savings goal comprises an indication of a maximum power consumption of the second electrical appliance over a time period.

15. The apparatus of claim 10 wherein the determining is based at least in part on an energy saving priority of the first electrical appliance.

16. The apparatus of claim 10 wherein
the first home automation control device is configured to removably couple with the first electrical appliance; and
the second home automation control device is configured to removably couple with the second electrical appliance.

17. The apparatus of claim 10, wherein the task comprises an idle task.

18. The apparatus of claim 17, wherein the apparatus is implemented according to one or more of:
a ZigBee standard;
an Insteon standard;
an Echelon LonWorks standard; and
a Z-Wave standard.

19. An electrical appliance comprising:
a home automation data store for a first home automation control device configured to control the electrical appliance, each of the first home automation control device and a second home automation control device configured as a peer device in a peer-to-peer network and comprising a data store for storing status information regarding all peer devices in the peer-to-peer network; and a processor configured to:
discover the presence of the second home automation control device;
negotiate, via a sequence of message exchanges over the peer-to-peer network, with the second home automation control device to deliver an optimized performance based at least in part on a first energy savings goal of the first home automation control device and a second energy savings goal of the second home automation control device; and
execute a task to achieve the optimized performance.

20. The electrical appliance of claim 19 wherein
the first home automation control device is configured to removably couple with the electrical appliance; and
the second home automation control device is configured to removably couple with the second electrical appliance.

* * * * *